(12) United States Patent
Caguimbay et al.

(10) Patent No.: US 12,554,790 B2
(45) Date of Patent: Feb. 17, 2026

(54) CLIENT COMPUTING DEVICE RESOURCE ADDRESS SHORTENING

(71) Applicant: THE BANK OF NEW YORK MELLON, New York, NY (US)

(72) Inventors: Rey Lord Caguimbay, New York, NY (US); Anthony Quizon, New York, NY (US); Ace Gamboa, New York, NY (US); Srinivas Annamalai, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 118 days.

(21) Appl. No.: 18/622,181

(22) Filed: Mar. 29, 2024

(65) Prior Publication Data
US 2025/0307330 A1    Oct. 2, 2025

(51) Int. Cl.
G06F 15/16        (2006.01)
G06F 16/955       (2019.01)
G06F 16/957       (2019.01)

(52) U.S. Cl.
CPC ........ *G06F 16/9566* (2019.01); *G06F 16/957* (2019.01)

(58) Field of Classification Search
None
See application file for complete search history.

(56) References Cited

U.S. PATENT DOCUMENTS

| 5,764,906 A | * | 6/1998 | Edelstein ............ G06F 16/9566 |
| | | | 707/E17.115 |
| 8,255,480 B2 | | 8/2012 | Bedingfield, Sr. et al. |
| 8,281,232 B2 | | 10/2012 | Vishria et al. |

(Continued)

FOREIGN PATENT DOCUMENTS

| CN | 104915347 B | 4/2019 |
| CN | 111026985 A | 4/2020 |

(Continued)

OTHER PUBLICATIONS

Jesse Luoto, "Using LLMs to reverse JavaScript variable name minification", Aug. 27, 2023, thejunkland.com, https://web.archive.org/web/20230827011155/https://thejunkland.com/blog/using-llms-to-reverse-javascript-minification.html pp. 1-6. (Year: 2023).

*Primary Examiner* — Phuoc H Nguyen
(74) *Attorney, Agent, or Firm* — Pillsbury Winthrop Shaw Pittman, LLP

(57) ABSTRACT

A method of the present disclosure includes receiving a request to generate a shortened resource address for a resource address associated with a client computing device resource stored on a client computing device, wherein the resource address is defined by a first character string, and wherein the request includes parameters associated with the client computing device resource; generating, based on at least a portion of the parameters and for the client computing device resource, a shortened resource address including a second character string that has different characters than the first character string; and storing the second character string and the parameters with an association to the first character string in a client computing device resource database such that the second character string is associated with the client computing device resource.

20 Claims, 10 Drawing Sheets

(56) References Cited

U.S. PATENT DOCUMENTS

| | | |
|---|---|---|
| 8,381,276 B2 | 2/2013 | Costinsky |
| 8,499,099 B1 | 7/2013 | Kogan |
| 8,630,200 B2 | 1/2014 | St. Jean et al. |
| 9,058,490 B1 | 6/2015 | Barker et al. |
| 9,544,355 B2 | 1/2017 | Cai et al. |
| 9,680,911 B2 | 6/2017 | Yuan |
| 9,766,797 B2 | 9/2017 | Chakra et al. |
| 10,425,492 B2 | 9/2019 | Comstock et al. |
| 10,789,321 B2 | 9/2020 | Zhou |
| 10,798,056 B2 | 10/2020 | Zhou |
| 10,915,595 B1 | 2/2021 | Van Oort |
| 12,130,895 B2 * | 10/2024 | Kidd .............. G06F 3/0482 |
| 12,307,247 B1 | 5/2025 | Dziubinski |
| 2007/0124414 A1 | 5/2007 | Bedingfield |
| 2010/0036862 A1 * | 2/2010 | Das .............. G06F 16/86 |
| | | 707/698 |
| 2011/0244882 A1 | 10/2011 | Hancock |
| 2011/0264992 A1 | 10/2011 | Vishria |
| 2013/0104038 A1 | 4/2013 | Galper et al. |
| 2013/0282592 A1 | 10/2013 | Zambrana |
| 2014/0164352 A1 * | 6/2014 | Denninghoff ......... G06F 16/953 |
| | | 707/711 |
| 2014/0344295 A1 * | 11/2014 | Lam .............. G06F 16/9535 |
| | | 707/754 |
| 2015/0025981 A1 | 1/2015 | Zaretsky et al. |
| 2016/0315835 A1 | 10/2016 | Brunn et al. |
| 2021/0035170 A1 | 2/2021 | Guest |
| 2023/0385358 A1 | 11/2023 | Yoon et al. |
| 2024/0289632 A1 | 8/2024 | Tan |
| 2024/0346254 A1 | 10/2024 | Liu |
| 2025/0298977 A1 | 9/2025 | Li |

FOREIGN PATENT DOCUMENTS

| | | |
|---|---|---|
| CN | 116756445 A | 9/2023 |
| KR | 10-2011-0132849 A | 12/2011 |

* cited by examiner

CLIENT COMPUTING DEVICE RESOURCE ADDRESS SHORTENING

CROSS-REFERENCE TO RELATED APPLICATIONS

This patent is related to U.S. Non-Provisional patent application Ser. No. 18/622,126, filed 29 Mar. 2024, titled "RESOURCE ADDRESS SHORTENING." The entirety content of each aforementioned patent filing is hereby incorporated by reference.

This patent is related to U.S. Non-Provisional patent application Ser. No. 18/622,226, filed 29 Mar. 2024, titled "RESOURCE ADDRESS SHORTENING UTILIZING SEARCH TRENDS." The entirety content of each aforementioned patent filing is hereby incorporated by reference.

BACKGROUND

1. Field

The present disclosure relates generally to computer resource storage and retrieval and more specifically to shortening resource addresses for client computing device resources.

2. Description of the Related Art

Enterprises often act as service providers that provide various services or resources via web applications, software, and utilities that are used by both clients and internal users as part of their day-to-day operations. These services and other resources may undergo a registration process which includes assigning a unique address, such as application identifier and uniform resource locators (URLs), that can be used to access the resource by a user at a later time. URLs and other information may be stored in an inventory or directory.

SUMMARY

The following is a non-exhaustive listing of some aspects of the present techniques. These and other aspects are described in the following disclosure.

Some aspects include a process including receiving a request to generate a shortened resource address for a resource address associated with a client computing device resource stored on a client computing device, wherein the resource address is defined by a first character string, and wherein the request includes parameters associated with the client computing device resource; generating, based on at least a portion of the parameters and for the client computing device resource, a shortened resource address including a second character string that has different characters than the first character string; and storing the second character string and the parameters with an association to the first character string in a client computing device resource database such that the second character string is associated with the client computing device resource.

Some aspects include a tangible, non-transitory, machine-readable medium storing instructions that when executed by a data processing apparatus cause the data processing apparatus to perform operations including the above-mentioned processes.

Some aspects include a system, including: one or more processors; and memory storing instructions that when executed by the processors cause the processors to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
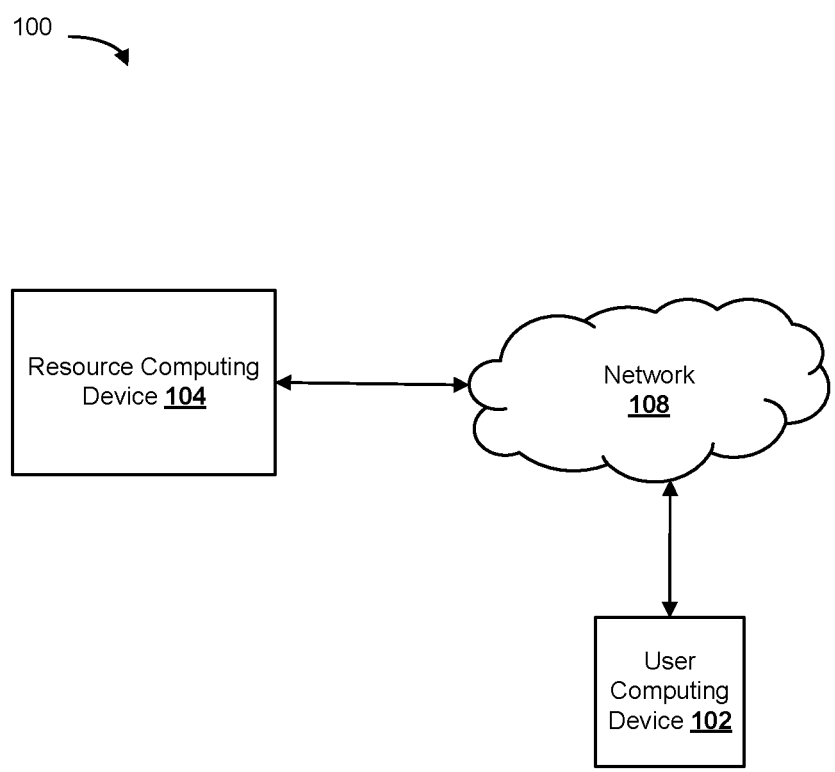
FIG. 1 is a block diagram illustrating an example of resource address shortening system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not yet foreseen) by others in the field of resource storage and retrieval management and resource addressing. Indeed, the inventor wishes to emphasize the difficulty of recognizing those problems that are nascent and will become much more apparent in the future should trends in industry continue as the inventor expects. Further, because multiple problems are addressed, it should be understood that some embodiments are problem-specific, and not all embodiments address every problem with traditional systems described herein or provide every benefit described herein. That said, improvements that solve various permutations of these problems are described below.

Resource Address Shortening

As discussed above, enterprises often offer various services via web applications, software, utilities, documents, or other resources that are used by both clients and internal users as part of their day-to-day operations. When these resources are created, the resources are often associated with an address (e.g., a uniform resource locator (URL)) that may be used to access the application service. This information may be stored in an inventory or directory. Table 1 illustrates examples of resource service and URLs:

TABLE 1

| Resource/Application/Service Name | Application/Service Identifier (Mnemonic) | URL |
| --- | --- | --- |
| Resource ABC | ABC | https://abc.enterprisename.com/ |
| Resource DEF | DEF | https:/def.enterprisename.net |
| Resource GHI | GHI | https://myghi.enterprisename.net/ |
| Resource JKL | JKL | https://myJLK:2.enterprisename.net/ |

It is imperative that users can easily locate and access resources that are needed. Each resource can be accessed by a user using the unique URL or other addressing protocol. In most cases, users are aware of the name or the mnemonic of the application or resource they need to use but knowing the exact address can be challenging for at least the following reasons: addresses, such as URLs, are usually not concise or user friendly, URLs are typically long and complex making it hard for a user to remember, a URL may not match the brand or the name of the application, or there might be missing or incomplete application documentation. Identifying the URL of a resource often involves the user searching the IT directory or going through the application's documentation. Finding or identifying the proper URL of the resource can cause delay impacting productivity and reduce user experience.

Resources, such as applications, typically undergo a review process before the application enters production. Details like description, infrastructure, availability, and corresponding URL may be documented. Application information including the URLs may be stored in an inventory or directory. An application owner may create and register a URL for the application. In most cases the URL created does not conform to the name of the application or to its function, making it hard for the user to identify or locate the URL. Users rely on finding the application URL from the application documentation or from the inventory or directory.

Systems and methods of the present disclosure provide resource address shortening using the resource data stored in an enterprise's inventory or directory. The resource address shortening system may identify all resources and their corresponding client facing resource addresses via a batch process. The batch may call a URL shortener service that creates a shortened secondary resource address that conforms to the resource name/identifier (e.g., a mnemonic) that takes/redirects the users to the same resource address when entered into a browser. For example, an application called Resource ABC with a mnemonic of ABC that has a client facing URL called https://resourceabc123.enterprisename.net/ABC/home, a secondary shortened URL called go/abc may be created. The primary URL may be shortened or otherwise reformatted in the case where an already short incomprehensible or difficult to remember primary URL is transformed into something that is more user-friendly but having more characters in its character string, abstracting the users from all complexities in the primary URL character string. The resource address shortening system may leverage the application mnemonic as the primary identifier making the URL easier to identify, remember, and consistent with all applications. In some embodiments, the resource address shortening system may not require user intervention. Furthermore, the systems and methods assume that there is an existing resource inventory/directory (e.g., an IT resource inventory or directory) that holds the information for application including its assigned URL. It also assumes that information like application name and description are available that can be used to dynamically generate the shortened URL. As such, a person of skill in the art in possession of the present disclosure will recognize the various technical benefits the resource address shortening system, which include, but are not limited to, resource addresses that are concise, user-friendly, and easier to remember and share. The shortened resource address may also be transmitted with less data and provide a consistent way of accessing applications across the enterprise. Thus, a shortened resource address may improve a user's experience because resources are easier to locate and share.

FIG. 1 depicts a block diagram of an example of a resource address shortening system 100, consistent with some embodiments. In some embodiments, the resource address shortening system 100 may include a client computing device 102 and a resource computing device 104. While one client computing device 102 and one resource computing device 104 are illustrated and discussed, one of skill in the art will recognize that the resource address shortening system 100 may include a plurality of client computing devices or a plurality of resource computing devices. The client computing device 102 and the resource computing device 104 may be in communication with each other over a network 108. In various embodiments, the client computing device 102 may be associated with a user (e.g., in memory of the resource address shortening system 100 in virtue of user profiles). These various components may be implemented with computing devices like that shown in FIG. 10.

In some embodiments, the client computing device 102 may be implemented using various combinations of hardware or software configured for wired or wireless communication over the network 108. For example, the client computing device 102 may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, a user badge, or other computing devices. In some embodiments, the client computing device 102 may include various combinations of hardware or software having one or more processors and capable of reading instructions stored on a tangible non-transitory machine-readable medium for execution by the one or more processors. Consistent with some embodiments, the client computing device 102 includes a machine-readable medium, such as a memory that includes instructions for execution by one or more processors for causing the client computing device 102 to perform specific tasks. In some embodiments, the instructions may be executed by the one or more processors in response to interaction by the user. One client computing device is shown, but commercial implementations may include 10, 100, 1000, 10,000, 100,000, more than one million, e.g., more than 10 million, geographically distributed over North America or the world or any number of client computing devices that would be apparent to one of skill in the art in possession of the present disclosure.

The client computing device 102 may include a communication system having one or more transceivers to communicate with other client computing devices or the resource computing device 104. Accordingly, and as disclosed in further detail below, the client computing device 102 may be in communication with systems directly or indirectly. As used herein, the phrase "in communication," and variants thereof, is not limited to direct communication or continuous communication and may include indirect communication through one or more intermediary components or selective communication at periodic or aperiodic intervals, as well as one-time events.

For example, the client computing device 102 in the resource address shortening system 100 of FIG. 1 may include a first (e.g., relatively long-range) transceiver to permit the client computing device 102 to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The client computing device 102 additionally may include second (e.g., short-range relative to the range of the first transceiver) transceiver to permit the client computing device 102 to communicate with each other or other client computing devices via a direct communication channel. Such second transceivers may be implemented by a type of transceiver supporting short-range (e.g., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the client computing device 102 to communicate with each other or other client computing devices via an ad-hoc or other wireless network.

The resource address shortening system 100 may also include or may be in connection with the resource computing device 104. For example, the resource computing device 104 may include one or more server devices, storage systems, cloud computing systems, or other computing devices (e.g., desktop computing device, laptop/notebook computing device, tablet computing device, mobile phone, etc.). In various embodiments, the resource computing device 104 may also include various combinations of hardware or software having one or more processors and capable of reading instructions stored on a tangible non-transitory machine-readable medium for execution by the one or more processors. Consistent with some embodiments, the resource computing device 104 includes a machine-readable medium, such as a memory (not shown) that includes instructions for execution by one or more processors (not shown) for causing the resource computing device 104 to perform specific tasks. In some embodiments, the instructions may be executed by the one or more processors in response to interaction by the user. The resource computing device 104 may also be maintained by an entity with which sensitive credentials and information may be exchanged with the client computing device 102. The resource computing device 104 may further be one or more servers that hosts resources such as applications, utilities, software, files, web pages, information technology resources, or other addressable resources that would be apparent to one of skill in the art in possession of the present disclosure. The resource computing device 104 may be more generally a web site, an online content manager, a service provider, a healthcare records provider, an electronic mail provider, a title insurance service provider, a datacenter management system, a financial institution or other entity that utilizes an application or other software or data resources in its services.

The resource computing device 104 may include various resources and may also be in communication with one or more external databases, that may provide additional information about the resources or the resources themselves and that may be used by the resource computing device 104. While a specific resource address shortening system 100 is illustrated in FIG. 1, one of skill in the art in possession of the present disclosure will recognize that other components and configurations are possible, and thus will fall under the scope of the present disclosure.

Figure 2:
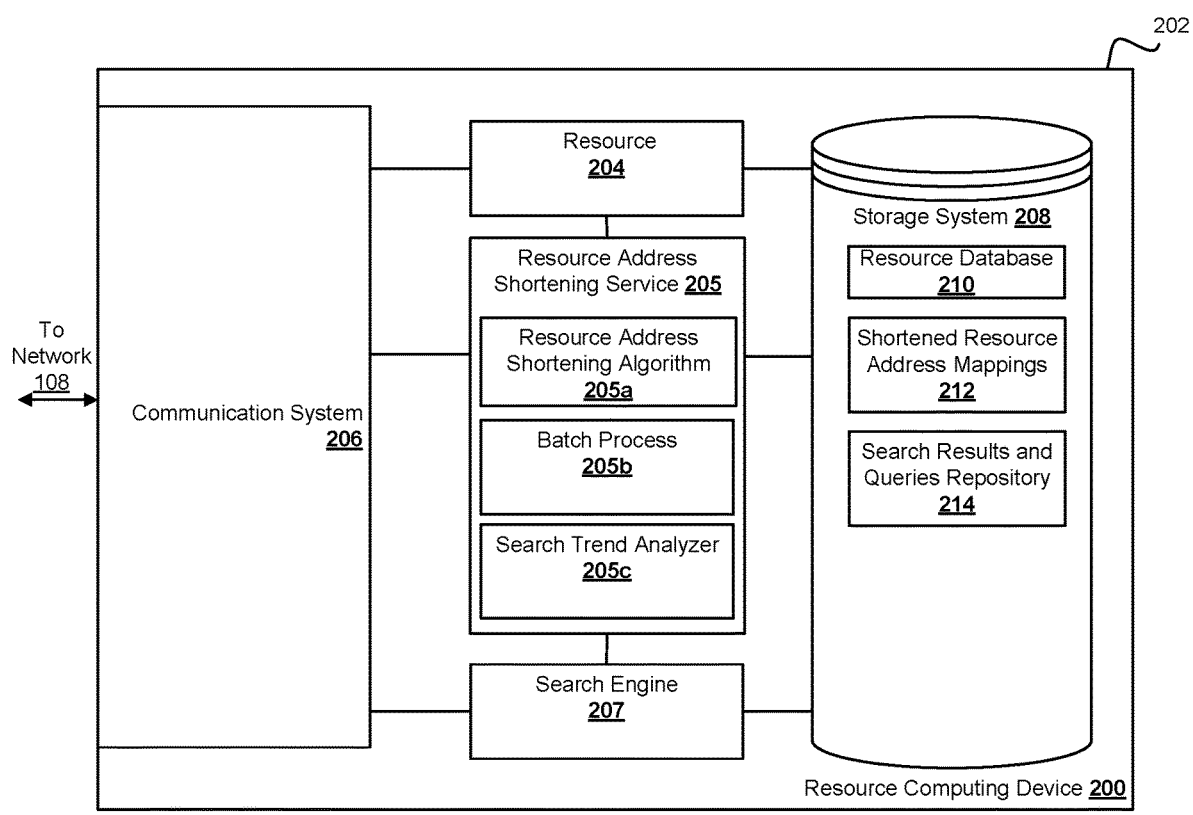
FIG. 2 is a block diagram illustrating an example of a resource computing device of the resource address system of FIG. 1, in accordance with some embodiments of the present disclosure.

FIG. 2 depicts an embodiment of a resource computing device 200, which may be the resource computing device 104 discussed above with reference to FIG. 1. However, in some embodiments, various components and processes discussed as being provided by the resource computing device 104/200 may be provided or executed at the client computing device 102. In the illustrated embodiment, the resource computing device 200 includes a chassis 202 that houses the components of the resource computing device 200, only some of which are illustrated in FIG. 2. For example, the chassis 202 may house a processing system (not illustrated) and a non-transitory memory system (not illustrated) that includes instructions that, when executed by the processing system, cause the processing system to provide a resource 204 that is configured to perform the functions of the software applications, utilities, or other addressable information technology resources, or some of the functions of the resource computing devices discussed below. Specifically, the resource 204 may be associated with an address (e.g., a URL, a URI, a file path, or other addresses that would be apparent to one of skill in the art in possession of the present disclosure) used by a user to access the resource 204, as discussed in further detail below.

The processing system and the non-transitory memory system may also include instructions that, when executed by the processing system, cause the processing system to provide a resource address shortening service 205 that is configured to perform one or more of the functions of the resource address shortening service, or the resource computing devices discussed below. For example, the resource address shortening service 205 may include one or more resource address shortening algorithms 205a used to shorten addresses of the resources 204, as discussed in further detail below. The resource address shortening service 205 may also include a batch process 205b that monitors a resource database 210 for resources that do not have an associated shortened resource address, as discussed in further detail below. The resource address shortening service 205 may also include a search trend analyzer 205c that analyzes search results and queries in a search results and queries repository 214 for various conditions, as discussed in further detail below.

The processing system and the non-transitory memory system may also include instructions that, when executed by the processing system, cause the processing system to provide a search engine 207 that is configured to perform the functions of the search engines, or the resource computing devices discussed below. While the resource 204, the resource address shortening service 205, and the search engine 207 are included on the same resource computing devices 104/200, it is contemplated that different information technologies resources may be provided by one or more different resource computing devices or the resource address shortening service 205 may be provided by a different server computing device than that of the resource computing device 104/200.

The chassis 202 may further house a communication system 206 that is coupled to the resource 204, the resource address shortening service 205, or the search engine 207 (e.g., via a coupling between the communication system 206 and the processing system) and that is configured to provide for communication through the network 108 of FIG. 1, as detailed below. The communication system 206 may allow the resource computing device 200 to send and receive information over the network 108 of FIG. 1.

The chassis 202 may also house a storage device (not illustrated) that provides a storage system 208 that is coupled to the resource 204, the resource address shortening service 205, or the search engine 207 through the processing system. The storage system 208 may be configured to store the resource database 210, the shortened resource address mappings 212, the search results and queries repository 214 or other data or instructions to complete the functionality discussed herein. In various embodiments, the storage system 208 may be provided on the resource computing device 200 or on a database accessible via the communication system 206. Furthermore, while the resource 204 or the resource address shortening service 205 are illustrated as being located on the resource computing device 104/200, the resource 204 or the resource address shortening service 205 may be included on the client computing device 102 of FIG. 1. For example, the resource 204 may be executed on a server computing device that is provided by the resource computing device 200 while a user operates the resource address shortening service 205 or the search engine 207 on the client computing device 102 remotely over the network 108 or vice versa. While a specific resource computing device 200 is illustrated in FIG. 2, one of skill in the art in possession of the present disclosure will recognize that other components and configurations are possible, and thus will fall under the scope of the present disclosure.

Figure 3:
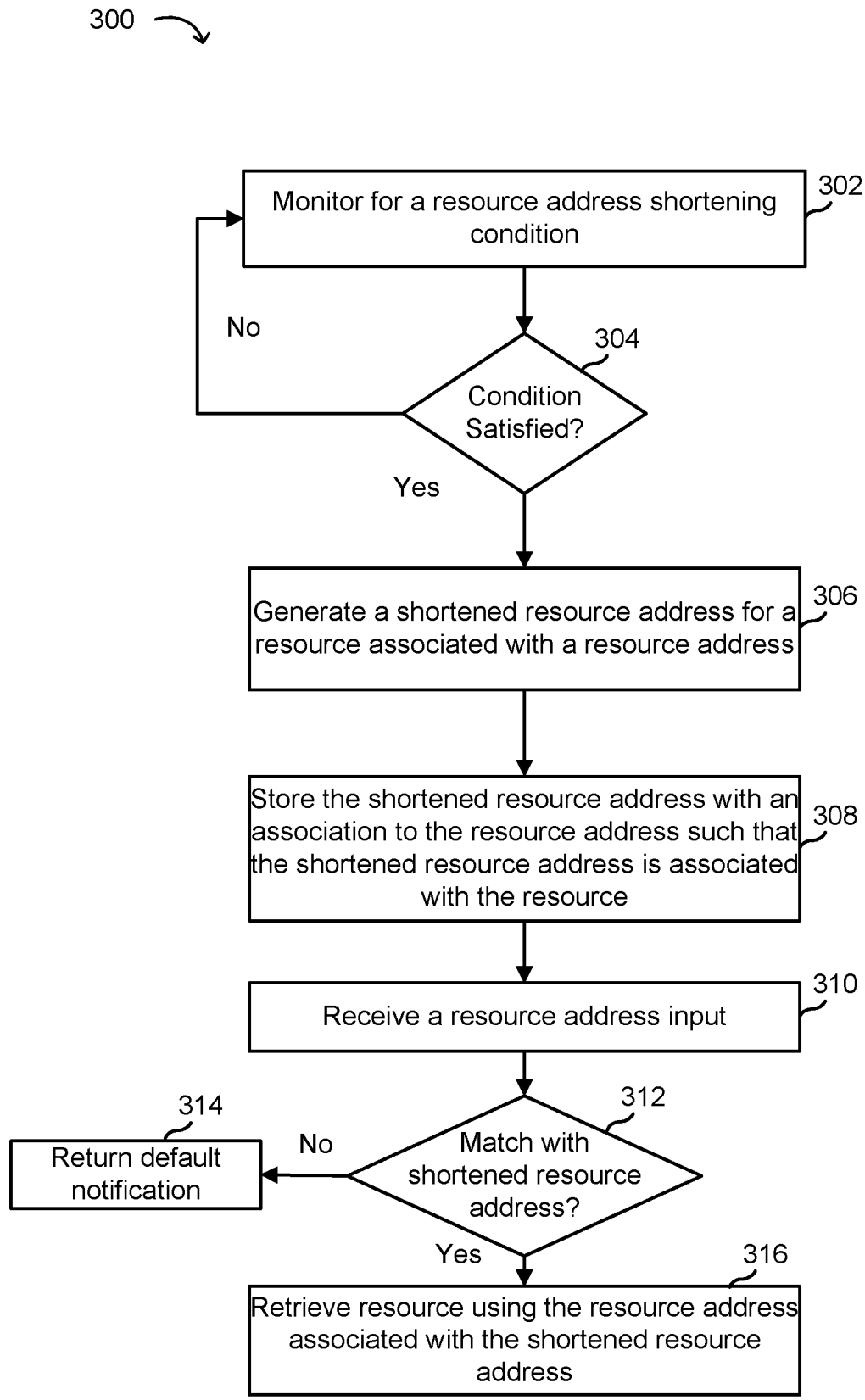
FIG. 3 is a flow chart illustrating an example of a method of resource address shortening, in accordance with some embodiments of the present disclosure.

FIG. 3 depicts an embodiment of a method 300 of resource address shortening, which in some embodiments may be implemented with at least some of the components of FIG. 1 or 2 discussed above. As discussed below, some embodiments make technological improvements to resource address shortening, resource addressing, and resource storage and retrieval. In a variety of examples, the systems and methods of the present disclosure monitor a resource directory for new resources that are being added to the resource directory and that are associated with a resource address but do not have a shortened resource address associated with that resource address. In some embodiments, the resource address shortening service may use resource information associated with the resource such as a resource name or a resource description in conjunction with a resource address shortening algorithm to generate a shortened resource address. That shortened resource address may then be associated with the corresponding resource address for the given resource. Notifications may be provided to users regarding the shortened resource address. When a user inputs the shortened resource address into a web browser or other application used to access a resource, the resource address shortening service may be called to identify any resources addresses associated with the shortened resource address and retrieve the resource associated with the resource address in response to the user input.

The method 300 is described as being performed by the resource address shortening service 205 included on the resource computing device 104/200. Furthermore, it is contemplated that the client computing device 102 may include some or all the functionality of the resource 204 or the resource address shortening service 205. As such, some or all of the steps of the method 300 may be performed by the client computing device 102 and still fall under the scope of the present disclosure. As mentioned above, the resource computing device 104/200 may include one or more processors or one or more servers, and thus the method 300 may be distributed across the those one or more processors or the one or more servers.

The method 300 may begin at block 302 where resources are monitored for a resource shortening condition. In an embodiment, at block 302, the resource address shortening service 205 of the resource computing device 104/205 may monitor for a resource address shortening condition associated with one or more of the resources 204. A resource address shortening service 205 may monitor for an indication that a new resource is ready to go live. For example, an application may undergo a review process during which a request for a resource address, such as a URL, may be made. Once the review process is completed and the application is ready to go live, the URL may be added to a repository such as the resource database 210 such that the URL is linked to the application. As such, an indication of the new application may be provided to the resource address shortening service 205. The new application indication may satisfy the resource address shortening condition.

In various embodiments, the resource address shortening condition may include identifying an existing resource entry in the resource database 210 that is not associated with a shortened resource address. For example, the resource address shortening service 205 may scan the resource database 210 for existing application entries that do not have an associated shortened URL. The batch process 205b may perform a process that scans the resource database 210 at periodic intervals such at predefined times (e.g., once per hour, once per day, once per week, once per month, or any other interval scheme that would be apparent to one of skill in the art in possession of the present disclosure). The batch process 205b may scan each application entry in the resource database 210 for an associated shortened URL and return any application entries that are not associated with a shortened URL. The returned applications entries may satisfy the resource address shortening condition. As such, at decision block 304, if the resource address shortening condition is not satisfied, the method 300 may return to block 302 where the resource address shortening service 205 continues to monitor for the resource address shortening condition.

However, if the resource address shortening condition is satisfied, the method 300 may proceed to block 306 where a shortened resource address for a resource address associated with a resource is generated. In an embodiment, at block 306, the resource address shortening service 205 may generate a shortened resource address that includes a character string that is different from a character string included in the resource address associated with the resource. While embodiments describe the resource address shortening service as providing a "shortened" resource address, embodiments of the present disclosure should not be limited to character strings of the shortened resource address having fewer characters than the character strings of the resource address. Rather, situations could occur where the shortened resource address has more characters in its character string than the resource address's character string or the same number of characters but in a more user-friendly, human-readable manner. For example, a URL including the character string "http://www.2k % h2.com" may be associated with a generated "shortened" URL of http://go/searchlongURL.

In another example, a regular URL associated with a resource may include the character string https://www.google.com/search?q=long+URL+example&sca_esv=5 82779246&rlz=1C1GCsEJ_enUS1028US1028&ci=_1BV YTPlu_NkPIPm9q16A8&ved=OahUK EwjEyr6ZkccCFFAxXvJkQIHRstAv0Q4dUDjCBA&uact= 5&oq=long+URL+example&g_Ip=E gxnd3Mtd216LXNlcnAidgEGxvbmcgVVJMIGV4YW1 wbGUyCBAAGIoFGJECMggQABiKB RiGAZIIEAAYigUYhgNIjx5QogdYIR1wAXgBkAEAm AGKBaABkhmqAQswLjMuNC4LjEu MrgBA8gBAPgBAcICChAAGEclgQYsAPCAgkQABiK BRgKGEPCAgUQABIABMICBxAA GIAEGArCAgYQABgWGB7CAggQABgWGB4YCuIDB BgAIEGIBgGQBgg&sclient=gws-wiz-serp." That regular URL may be associated with a generated "shortened" URL of "http://go/searchlongURL". In this example, the character string of the shortened URL has fewer characters than the regular URL.

In an embodiment, the resource address shortening service 205 may obtain resource information associated with the resource from the resource database 210. For example, the resource information may include at least one of a resource name, a resource description, or any other resource information that may be apparent to one of skill in the art of the present disclosure. The resource address shortening service 205 may provide the resource information that includes at least one of the resource name or the resource description to the resource address shortening algorithm 205a. In various embodiments, the resource address shortening algorithm 205a may include large language model (LLM) or other artificial intelligence or machine learning model that would be apparent to one of skill in the art in possession of the present disclosure. The resource information may be provided as inputs to the model. For example, the resource name, the resource description, or other resource information may be provided an input to the model. The resource address shortening algorithm 205a may return the shortened resource address to the resource address shortening service 205.

In some embodiments, a portion of the shortened resource address may identify the resource address shortening service 205 such that the resource address shortening service 205 is activated when the shortened resource address is inputted into a web browser or other application used to access the resource 204. Another portion of the shortened resource address may include a keyword created by the resource address shortening algorithm 205a. For example, in the URL of "http://go/searchlongURL", "go" identifies the resource address shortening service 205 such that the resource address shortening service 205 is called and performs a matching determination using the keyword or key phrase "searchlongURL" when the shortened resource address is inputted as discussed below.

The method 300 may proceed to block 308 where the shortened resource address is stored with an association to the resource address such that the shortened resource address is associated with the resource 204. In an embodiment, at block 308, the resource address shortening service 205 may map the shortened resource address to the resource address that is associated with the resource 204. In various embodiments, the resource address shortening service 205 may store a mapping of the shortened resource address to the resource address in the resource database 210 such that the shortened resource address is associated with the resource 204 for which shortened resource address was generated. In other embodiments, the mapping of the shortened resource address to the resource address may be stored in the shortened resource address mapping 212. In addition, the shortened resource address may be shared with users of the client computing device(s) 102. The shortened resource address may be sent to the users via email, a web posting, or other form of information dissemination that would be apparent to one of skill in the art in possession of the present disclosure.

The method 300 may proceed to block 310 where a resource address input is received. In an embodiment, at block 310, the resource address shortening service 205 may receive a resource address input. For example, the user of client computing device 102 may enter a resource address in a browser, which may be received by the resource address shortening service 205. As discussed above, the resource address may include an identifier of the resource address shortening service 205 such that the resource address shortening service 205 is accessed and receives the resource address input.

The method 300 may proceed to decision block 312 where it is determined whether the resource address received matches a shorted resource address that is associated with an resource. In an embodiment, at decision block 312, the resource address shortening service 205 may determine whether the received resource address is a shortened resource address by matching the received resource address to the stored shortened resource addresses in the resource database 210 or the shortened resource address mappings 212.

If, at decision block 312, the resource address does not match any of the shortened resource address in the resource database 210, then the method 300 may proceed to block 314 where a default notification is returned. In an embodiment, at block 314, resource address shortening service 205 may provide a default notification if there is no matching shortened resource address in the resource database 210 or the shortened resource address mappings 212. Continuing with the example above for the shortened resource address "http://go/searchlongURL", the resource address provided by the user may be "http://go/searchshortURL". As a result, the resource address shortening service 205 may determine that there is no match for "http://go/searchshortURL" and return a default notification to the user that there is no matching stored resource address.

If, at decision block 312, the resource address does match a shortened resource address in the resource database 210, then the method 300 may proceed to block 316 where the resource is retrieved using the resource address that is associated with the shortened resource address stored in the resource database. In an embodiment, at block 316, the resource address shortening service 205 may use the resource address that is associated with the matched shortened resource address to retrieve the resource 204 for presentation to the client computing device 102. In other embodiments, the application running at the client computing device that made the resource address input may receive from the resource address shortening service 205 the regular resource address and then automatically input the regular resource address to retrieve the resource.

In various embodiments of method 300, the resource address shortening algorithm 205a may obtain training inputs from the resource address shortening system 100 as it is being operated. For example, the resource address shortening algorithm 205a may obtain feedback from users when the shortened resources address is created and provided to users as described in block 308. For example, a user may manually change the shortened resource address or send a request that a different shortened resource address be generated. In other examples, the user may do nothing and begin using the shortened resource address. This feedback or lack of feedback may be used to train the resource address shortening algorithm 205a. Other training inputs may include user inputs of resource addresses that are received by the resource address shortening service 205. For example, the number of resource addresses that match the shortened resource addresses, a number of non-matching resource addresses received and a determination of the likely shortened resource address the user was attempting to access, the lack of use of a shortened resource address, the number of times that a regular resource address is used over the shortened resource address, or other training inputs that would adjust the resource address shortening algorithm 205a to fine tune the shortened resource address generator according to the users of the resource address shortening system 100. As such, the resource address shortening algorithm 205a may learn what are user-friendly, human-readable, shortened resource addresses based on user feedback and training of the resource address shortening algorithm 205a, and thus, the shortened resource address may dynamically change over time.

In other embodiments of method 300, the method 300 may be repeated for multiple resources 204. In other embodiments, each resource address may be associated with more than one shortened resource address. Furthermore, the resource address shortening service 205 may prevent duplicate shortened resource addresses from being generated. If a resource address is changed, the method 300 may generate a new shortened resource address or reassociate the changed resource address with the existing shortened resource address.

Figure 4:
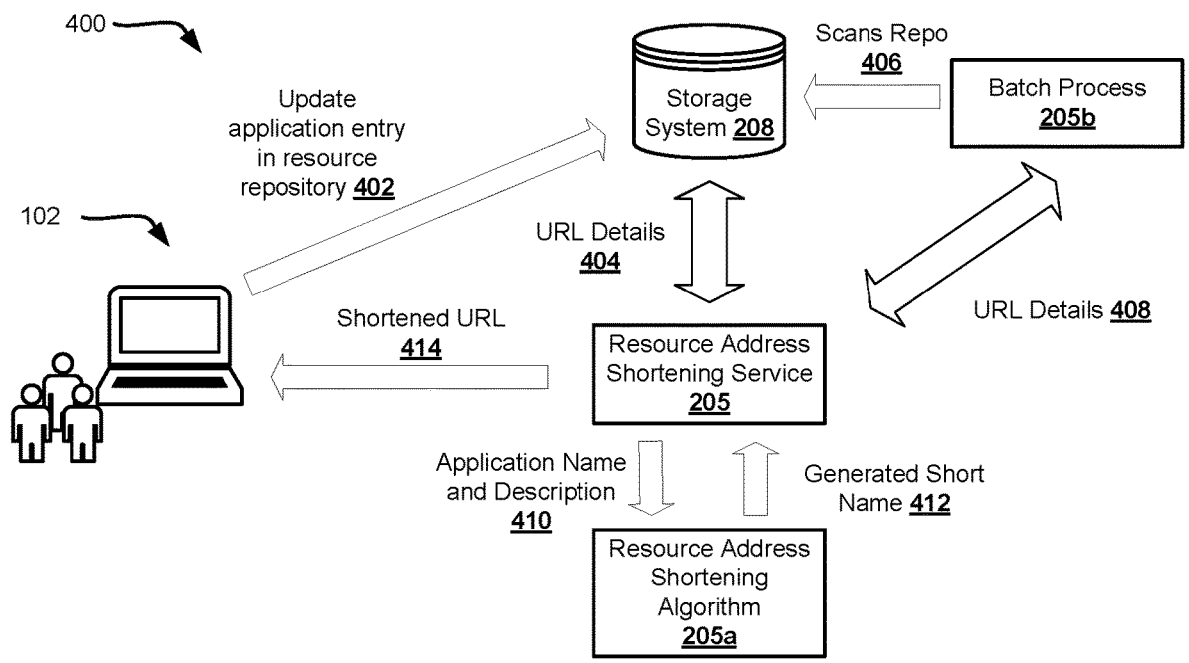
FIG. 4 illustrates a block diagram of an example of resource address shortening during the method of FIG. 3 for a uniform resource locator (URL) of a stored application, in accordance with some embodiments of the present disclosure.

FIG. 4 illustrates an example of workflow 400 of the method 300. At step 402, the client computing device 102 updates an application in the resource database 210 provided by the storage system 208. The application may be associated with a URL. The creation or updating of an application may trigger application information and URL information being passed to the resource address shortening service 205, at step 404. Similarly, at step 406 the batch process 205b may scan the resource database 210 in the storage system 208 and discover an application that is not associated with a shortened URL. The batch process 205b may provide application information and URL information being passed to the resource address shortening service 205, at step 408. At step 410, the resource address shortening service 205 may pass the application information and the URL information such as an application name or an application description to the resource address shortening algorithm 205a. At step 412, the resource address shortening algorithm 205a may generate the shortened URL using, for example, a model and provide the shortened URL to the resource address shortening service 205. The resource address shortening service 205 may store the shortened URL in the storage system 208 and associate it with the regular URL for the application. At step 414, the shortened URL may also be sent to the users of the client computing device 102 such that the users can use the shortened URL to access the application.

Thus, the systems and methods of the present disclosure provide resource address shortening for resources. A resource address shortening service may detect new resources that are associated with a resource address or stored resources that are associated with a resource address and determine that a resource is not associated with a shortened resource address. Using resource information, the resource address shortening service may use a resource shortening algorithm to determine a shortened resource address that is more user-friendly and easier to remember than the regular resource address. The resource address shortening service may associate the shortened resource address with the resource address and notify users of shortened resource address so that users may use the shortened resource address when attempting to access its associated resource. As such, improvements to the resource address shortening technology is realized that provides more effective resource addresses and thus reduces network traffic, resource access time, and other technological benefits that would be appreciated by one skill in the art in possession of the present disclosure.

Resource Address Shortening Utilizing Search Trends

Furthermore, in enterprises, a notable challenge lies in navigating an extensive array of resource addresses (e.g., URLs) associated with access requests, software requisitions, portals, monitoring and logging tools, development resources and various repositories, amongst others. Enterprises may maintain various resource addresses for different purposes, including internal intranet sites, ticketing and request portals, knowledge and collaboration workspaces, issue tracking and project management tools, code repositories, various portals, in-house web applications, or other information technology resources that would be apparent to one of skill in the art in possession of the present disclosure. While this multitude of resources may be important to the day-to-day operations of the enterprise, the multitude of resources often result in a fragmented and confusing experience for users. With numerous resources to navigate, users may struggle to find the right tool for their task, leading to inefficiencies, delays, and frustrations.

To address these complexities, there is a clear need for a system and method that leverages search trends to dynamically generate shortcut resource addresses. Such a solution would enable users to access the most relevant resources swiftly, based on real-time search data and trending topics. By seamlessly integrating search trends into shortcut resource address generation, systems and methods of the present disclosure aim to provide a solution to the challenges posed by large enterprises and their large network of resources.

For users, a prior process of managing the large network of resources within enterprises necessitates the use of browser bookmarks, a corporate wiki or saving addresses on devices via text editors. The systems and methods of the present disclosure introduce a method of utilizing search trends to facilitate the creation of shortcut resource addresses. Leveraging the trending search results, the system analyzes the resource addresses associated with these trends. Upon identification of trending resource addresses that are absent within the resource address shortening service, the system automatically extracts pertinent information, such as search terms/keywords, that are related to the resource address associated with the resource. Utilizing the extracted information, the system generates a shortened resource address via the resource address shortening service. This dynamic process ensures that commonly searched/trending resources and their associated resource addresses are made available to the users via a concise and user-friendly shortened resource addresses. The generated shortened resource addresses are then broadcasted, enabling immediate access and usability across the enterprise. This innovative approach not only streamlines the resource shortening process but also ensures that users can swiftly access relevant content through trend-driven shortened resource addresses.

As such, various technological benefits may be achieved such as the resource address shortening services creating concise and user-friendly resource addresses that are easier for users to remember, share, and type into browsers. Furthermore, embodiments may enhance user accessibility and interaction with emerging content trends. Shortened resource addresses may be tailored to be intuitive to the users and as the process matures, a level of confidence from the user will be high such that shortened resource addresses will be second nature to the user and a search will not be necessary, thus reducing network traffic and search engine use. Shortened resource addresses may be created automatically and dynamically and the resource address shortening service may provide convenient link management allowing flexibility to update the destination/regular resource address without changing the shortened resource address, ensuring it always leads to active and relevant contents. Furthermore, shortened resource addresses reduce clutter on printed materials or presentations, and thus save on storage usage and network traffic.

Figure 5:
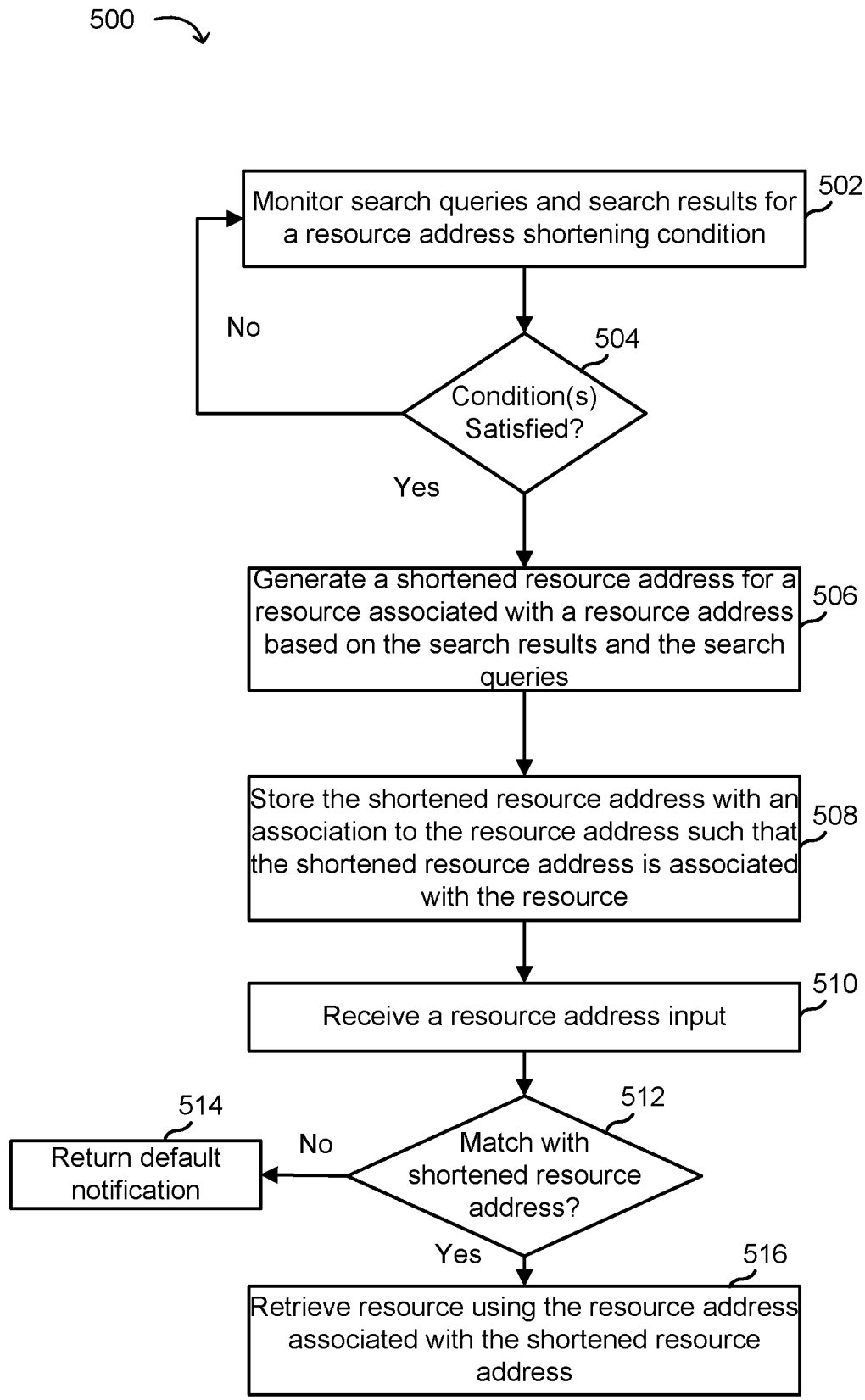
FIG. 5 is a flow chart illustrating an example of a method of resource address shortening based on search engine queries and results for stored resources, in accordance with some embodiments of the present disclosure.

FIG. 5 depicts an embodiment of a method 500 of resource address shortening utilizing search trends, which in some embodiments may be implemented with at least some of the components of FIGS. 1 and 2 discussed above. As discussed below, some embodiments make technological improvements to resource address shortening, resource addressing, resource storage and retrieval, and search engines. In a variety of examples, the systems and methods of the present disclosure analyze search trends to identify resources and their associated resources addresses that are trending. In some embodiments, the resource address shortening service may use information associated with the resource, the resource address associated with the resources, or search terms included in search queries that returned the resource during the search to generate a shortened resource address. That shortened resource address may then be associated with the corresponding regular resource address for the given resource. Notifications may be provided to users regarding the shortened resource address. When a user inputs the shortened resource address into a web browser or other application used to access a resource, the resource address shortening service may be called to identify any mapped resources addresses associated with the shortened resource address and retrieve the resource associated with the resource address in response to the user input.

The method 500 is described as being performed by the resource address shortening service 205 included on the resource computing device 104/200. Furthermore, it is contemplated that the client computing device 102 may include some or all the functionality of the resource 204 or the resource address shortening service 205. As such, some or all of the steps of the method 500 may be performed by the client computing device 102 and still fall under the scope of the present disclosure. As mentioned above, the resource computing device 104/200 may include one or more processors or one or more servers, and thus the method 500 may be distributed across the those one or more processors or the one or more servers.

The method 500 may begin at block 502 where a search repository is monitored for a resource address shortening condition. In an embodiment, at block 502, the resource address shortening service 205 of the resource computing device 104/205 may monitor for activity that satisfies a resource address shortening condition associated with one or more of the resources 204. The monitoring may include analyzing search trends of the search engine 207 that are stored in a search results and queries repository 214. The analyzing may be performed by the search trend analyzer 205c. As discussed above, the search results and queries repository 214 may include recent search queries and the returned search results associated with those search queries. Identifying trending resource addresses in search results that satisfy the resource address shortening condition includes identifying search queries or search results that satisfy a threshold for a specific timeframe. In other embodiments, the identification of a trending resource address in search results and queries includes satisfying a threshold of a number of search results that users have identified as helpful or correct via some feedback mechanisms (e.g., a number of selected thumbs up buttons).

In some embodiments, the resource address shortening service 205 may determine whether any of the search results or queries that do satisfy a search trend condition also have an associated existing shortened resource address. The resource address shortening condition may be satisfied if there is not an associated shortened resource address and not satisfied if there is an existing associated shortened resource address. As such, at decision block 504, if the resource address shortening condition is not satisfied, the method 500 may return to block 502 where the resource address shortening service 205 continues to monitor for activity that satisfies the resource address shortening condition.

However, if the resource address shortening condition is satisfied, the method 500 may proceed to block 506 where a shortened resource address for a resource associated with a resource address is generated. In an embodiment, at block 506, the resource address shortening service 205 may generate a shortened resource address that includes a character string that is different from a character string included in the resource address associated with the resource.

In an embodiment, the resource address shortening service 205 may obtain resource information associated with the resource from the resource database 210 or the search results and queries repository 214. For example, the resource information may include the search terms included in search queries that resulted in identifying the particular resource 204, the resource address, or any other resource information that may be apparent to one of skill in the art of the present disclosure. The resource address shortening service 205 may provide the resource information that includes at least the search terms to the resource address shortening algorithm 205a. In various embodiments, the resource address shortening algorithm 205a may include large language model (LLM) or other artificial intelligence or machine learning model that would be apparent to one of skill in the art in possession of the present disclosure. The resource information may include at least the search terms as inputs to the model. The resource address shortening algorithm 205a may return the shortened resource address to the resource address shortening service 205. In some embodiments, a portion of the shortened resource address may identify the resource address shortening service 205 such that the resource address shortening service 205 is activated when the shortened resource address is inputted into a web browser or other application used to access the resource 204.

For example, a trending URL identified by the search trend analyzer 205c may be "www.mybenefitsenrollment.com" that is associated with a benefits webpage. The related search terms that are associated with identifying the URL as a search result may include, "Where can I enroll my benefits for next year?", "benefits sign-up", "benefits portal", and "annual medical enrollment." Using the search terms, the resource address shortening algorithm 205a may determine a candidate normalized short name of "benefitsenrollment." The resource address shortening service 205 may then use the short name to generate the shortened URL of "http://go/benefitsenrollment." In the URL of "http://go/benefitsenrollment", "go" identifies the resource address shortening service 205 such that the resource address shortening service 205 is called and performs a matching determination using "benefitsenrollment" when the shortened resource address is inputted as discussed below. Although "go" is used throughout this disclosure, it is understood that additional and/or alternate identifiers may be used within the scope of this disclosure.

The method 500 may proceed to block 508 where the shortened resource address is stored with an association to the resource address of the resource such that the shortened resource address is associated with the resource. In an embodiment, at block 508, the resource address shortening service 205 may map the shortened resource address to the resource address that is associated with the resource 204. In various embodiments, the resource address shortening service 205 may store a mapping of the shortened resource address to the resource address in the resource database 210 or the shortened resource address mappings 212 such that the shortened resource address is associated with the resource 204 for which shortened resource address was generated. In addition, the shortened resource address may be shared with users of client computing device(s) 102. The shortened resource address may be sent to the users via email, a web posting, or other form of information dissemination that would be apparent to one of skill in the art in possession of the present disclosure. The shortened resource address may also be shared with the search engine 207 or the search engine 207 may have access to the resource database 210 such that when an resource 204 is returned in a search result, the associated shortened resource address may be presented in the search results.

The method 500 may proceed to block 510 where a resource address input is received. In an embodiment, at block 510, the resource address shortening service 205 may receive a resource address input. For example, the user of client computing device 102 may enter a resource address in a browser, which may be received by the resource address shortening service 205. As discussed above, the resource address may include an identifier (e.g., "go" in the example above) of the resource address shortening service 205 such that the resource address shortening service 205 is accessed and receives the resource address input.

The method 500 may proceed to decision block 512 where it is determined whether the resource address received matches a shortened resource address that is associated with a resource. In an embodiment, at decision block 512, the resource address shortening service 205 may determine whether the received resource address is a shortened resource address by matching the received resource address to the stored shortened resource addresses in the resource database 210. The matching may be performed by pairwise matching or identifying hash collisions of shortened resources addresses and the resource address received when those addresses are hashed according to a hash algorithm include in the resource address shortening service 205.

If, at decision block 512, the resource address does not match any of the shortened resource addresses in the resource database 210 or the shortened resource address mappings 212, then the method 500 may proceed to block 514 where a default notification is returned. In an embodiment, at block 514, resource address shortening service 205 may provide a default notification if there is no matching shortened resource address in the resource database 210 or the shortened resource address mappings 212. Continuing with the example above for the shortened resource address "http://go/benefitsenrollment", the resource address provided by the user may be "http://go/benefits". As a result, the resource address shortening service 205 may determine that there is no match for "http://go/benefits" and return a default notification to the user that there is no matching stored resource address.

In other embodiments, the resource address shortening service 205 may call the search engine 207 and provide the short name included in the resource address provided by the user. The short name may be entered as a search term in a search query. The search engine 207 may return search result for the search term, which may include the information resource asset and its shortened resource address. For example, where the user inputted "http://go/benefits", the resource address shortening service 205 may enter the short name "benefits" into the search engine 207. The search engine 207 may return results that may include the shortened resource address "http://go/benefitsenrollment" as one of the search results.

If, at decision block 512, the resource address does match a shortened resource address in the resource database 210 or shortened resource address mappings 212, then the method 500 may proceed to block 516 where the resource is retrieved using the resource address that is associated with the shortened resource address stored in the IT resource database. In an embodiment, at block 516, the resource address shortening service 205 may use the resource address that is associated with the matched shortened resource address to retrieve the resource 204 for presentation to the client computing device 102.

In various embodiments of method 500, the resource address shortening algorithm 205a may obtain training inputs from the resource address shortening system 100 as it is being operated. For example, the resource address shortening algorithm 205a may obtain feedback from users when the shortened resources address is created and provided to users as described in block 508. For example, a user may manually change the shortened resource address, send a request that a different shortened resource address be generated for all users, or for the individual user. In other examples, the user may do nothing and begin using the shortened resource address. This feedback or lack of feedback may be used to train the resource address shortening algorithm 205a. Other training inputs may include user inputs of resource addresses that are received by the resource address shortening service 205. For example, training inputs may include the number of resource addresses that match the shortened resource addresses, a number of non-matching resource addresses received and the likely shortened resource address the user was attempting to access, the lack of use of a shortened resource address, the number of times that a regular resource address is used over the shortened resource address, or other training inputs that would adjust the resource address shortening algorithm 205a according to the users of the resource address shortening system 100. As such, the resource address shortening algorithm 205a may learn what are user-friendly human-readable shortened resource addresses based on user feedback and training of the resource address shortening algorithm 205a and the shortened resource address may change over time.

In other embodiments, the method 500 may be repeated for multiple resources 204. In other embodiments, each resource address may be associated with more than one shortened resource address. Furthermore, the resource address shortening service 205 may prevent duplicate shortened resource addresses from being generated for different resources. In various embodiments, if a resource address is changed, the method 500 may generate a new shortened resource address.

In other embodiments of method 500, a user may perform a search with the search engine 207 using a search term. For any resource 204 associated with a resource address that is returned in the search results, any associated shortened resource address may be presented to the user over the regular resource address such that the user knows the shortened resource address for that particular resource 204, and thus the user may not use the search engine 207 to determine the resource 204 for which the user is searching at a subsequent time.

Figure 6:
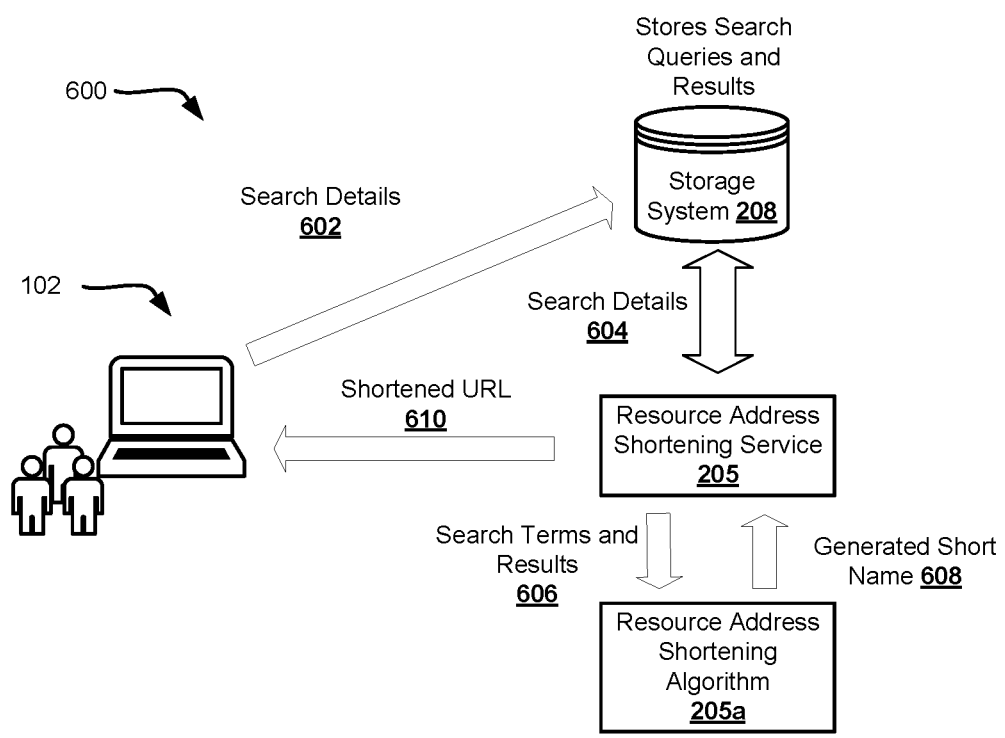
FIG. 6 illustrates a block diagram of an example of resource address shortening during the method of FIG. 5 for a uniform resource locator (URL) of a stored application using the search engine queries and results, in accordance with some embodiments of the present disclosure.

FIG. 6 illustrates an example of workflow 600 of the method 500. At step 602, the client computing devices 102 provide various search queries for an resource. The search engine 207 may return search results to the client computing devices 102 and the search details (e.g., queries and results) may be stored in the search results and queries repository 214 in the storage system 208. At step 604, when one or more search conditions are satisfied (e.g., a number of search results containing a particular resource in a defined interval, and the resource 204 does not have a shortened URL associated with it) then the search details are provided to the resource address shortening service 205. At step 606, the resource address shortening service 205 may provide search terms and results or other resource information to the resource address shortening algorithm 205a. The resource address shortening algorithm 205a may generate a short name for the application using the search terms and results as inputs to a model. The short name may be provided to the resource address shortening service 205, at step 608. The resource address shortening service 205 may generate the shortened URL with the short name. At step 610, the shortened URL may be provided to the user, which may be performed when the user performs a search with a search engine 207 that returns the resource, via a web application notification, via an email distribution, via an intranet announcement, or other information dissemination technique that would be apparent to one of skill in the art in possession of the present disclosure.

Thus, systems and methods of the present disclosure provide resource address shortening utilizing search trends. A resource address shortening service may determine when search results or queries satisfy a predetermined resource address shortening condition. The resource address shortening service may use search queries and results to determine a shortened resource address that is more user friendly and provide the shortened resource address to the user as well as associate the shortened resource address with the regular resource address that is associated with the resource. When the user enters the shortened resource address in place of the resource address, the resource address shortening service may match the received shortened resource address with the stored shortened resource address. The resource address associated with the stored shortened resource address may be returned to the resource address shortening service. The resource address shortening service may retrieve the resource using the resource address and provide the resource to the user. As such, improvements to the resource address shortening technology is realized that provides more effective resource addresses and thus reduces network traffic, resource access time, and other technological benefits that would be appreciated by one skill in the art in possession of the present disclosure.

Client Computing Device Resource Address Shortening

Often, users rely on client computing device application software to help with their day-to-day tasks. Some examples of these are launching the Notepad app and opening a "To-Do list" file or opening the Teams app and loading the user's group chat. Running client computing device applications requires multiple steps for it to be in a working state for the user to perform a task or consume content. This takes the user's precious time and requires them to remember the parameters for launching their desktop applications. The need exists for a system and method that simplifies the process of launching software programs with pre-filled parameters.

For example, accessing client computing applications requires the clicking of a desktop icon, typing the application command, which may include a complex string of characters to locate a file or application in a file directory, or manually searching a file directory itself via the operating system's user interface or a user interface of an open application. In addition, the user must input or select parameters that are specific to the tasks that they are doing. For example, to help with daily tasks, a user opens the "Notepad.exe" application, clicks the file menu and opens the "to_do.txt" file. That takes 3 steps for the user to readily use his "To Do" list file. While a user may create shortcut icons for applications and files on a desktop, creating too many shortcuts or saving too many files creates a cluttered mess of shortcuts on the user's home screen and may cause performance issues.

The systems and methods of the present disclosure provide a client computing device shortened resource address system and method. Users may be able to create resource shortcuts via the resource address shortening service. When the user accesses the resource address shortening service, the user may be able to select the client computing device application or other client computing device resource that the user wants to use and pre-fill the necessary input parameters. The user may enter a keyword to associate with the client computing device resource. For the user to run the shortened resource address, the user may access a native application installed on their local client computing device or a web application. Once installed, the user can execute "Go <keyword>" to launch the client computing device resource.

For example, the user may open the resource address shortening service website to create a shortcut for a "To-Do" list text file. On the user interface provide by the resource address shortening service website, the user may select "Notepad.exe" application, and on the parameter, the user may enter "to_do.txt." The user may use the keyword "to_do" to associate to this client computing device resource address. After installing the "resource address shortening service" native application, the user may open this "To-Do" list text file by typing "go to_do" on the resource address shortening service native application where "go" is a command recognized by the resource address shortening service to open a resource. Any pre-filled or pre-selected parameters may be returned when opening the resource as well.

Figure 7:
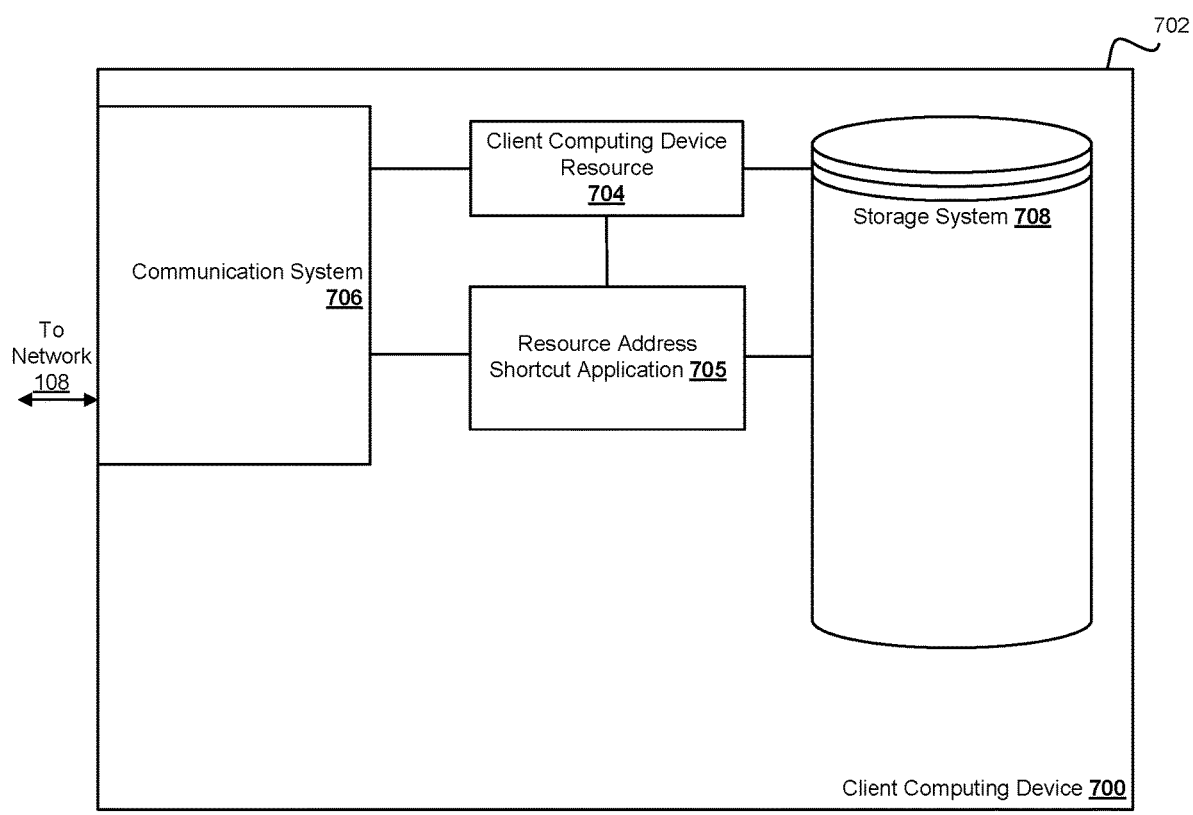
FIG. 7 is a block diagram illustrating an example of a client computing device of the resource address system of FIG. 1, in accordance with some embodiments of the present disclosure.

FIG. 7 depicts an embodiment of a client computing device 700, which may be the client computing device 102 discussed above with reference to FIG. 1. However, in some embodiments, various components and processes discussed as being provided by the client computing device 102/700 may be provided or executed at the client computing device 102. In the illustrated embodiment, the client computing device 700 includes a chassis 702 that houses the components of the client computing device 700, only some of which are illustrated in FIG. 7. For example, the chassis 702 may house a processing system (not illustrated) and a non-transitory memory system (not illustrated) that includes instructions that, when executed by the processing system, cause the processing system to provide an client computing device resource 704 that is configured to perform the functions of the software applications, utilities, or other addressable client computing device resources, or some of the functions of the client computing devices discussed below. Specifically, the client computing device resource 704 may be associated with an address (e.g., a URL, a URI, a file path, or other addresses that would be apparent to one of skill in the art in possession of the present disclosure) used by a user to access the client computing device resource, as discussed in further detail below.

The processing system and the non-transitory memory system may also include instructions that, when executed by the processing system, cause the processing system to provide a resource address shortcut application 705 that is configured to perform the functions of the resource address shortcut applications, or the client computing device discussed below. For example, the resource address shortcut application 705 may include a native application or a web browser used to access the resource address shortening service 205 of FIG. 2, as discussed in further detail below.

The chassis 702 may further house a communication system 706 that is coupled to the client computing device resource 704 or the resource address shortcut application 705 (e.g., via a coupling between the communication system 706 and the processing system) and that is configured to provide for communication through the network 108 of FIG. 1, as detailed below. The communication system 706 may allow the client computing device 700 to send and receive information over the network 108 of FIG. 1.

The chassis 702 may also house a storage device (not illustrated) that provides a storage system 708 that is coupled to the client computing device resource 704 or the resource address shortcut application 705 through the processing system. The storage system 708 may be configured to store data or instructions to complete the functionality discussed herein. In various embodiments, the storage system 708 may be provided on the client computing device 700 or on a database accessible via the communication system 706. While a specific client computing device 700 is illustrated in FIG. 7, one of skill in the art in possession of the present disclosure will recognize that other components and configurations are possible, and thus will fall under the scope of the present disclosure.

Figure 8:
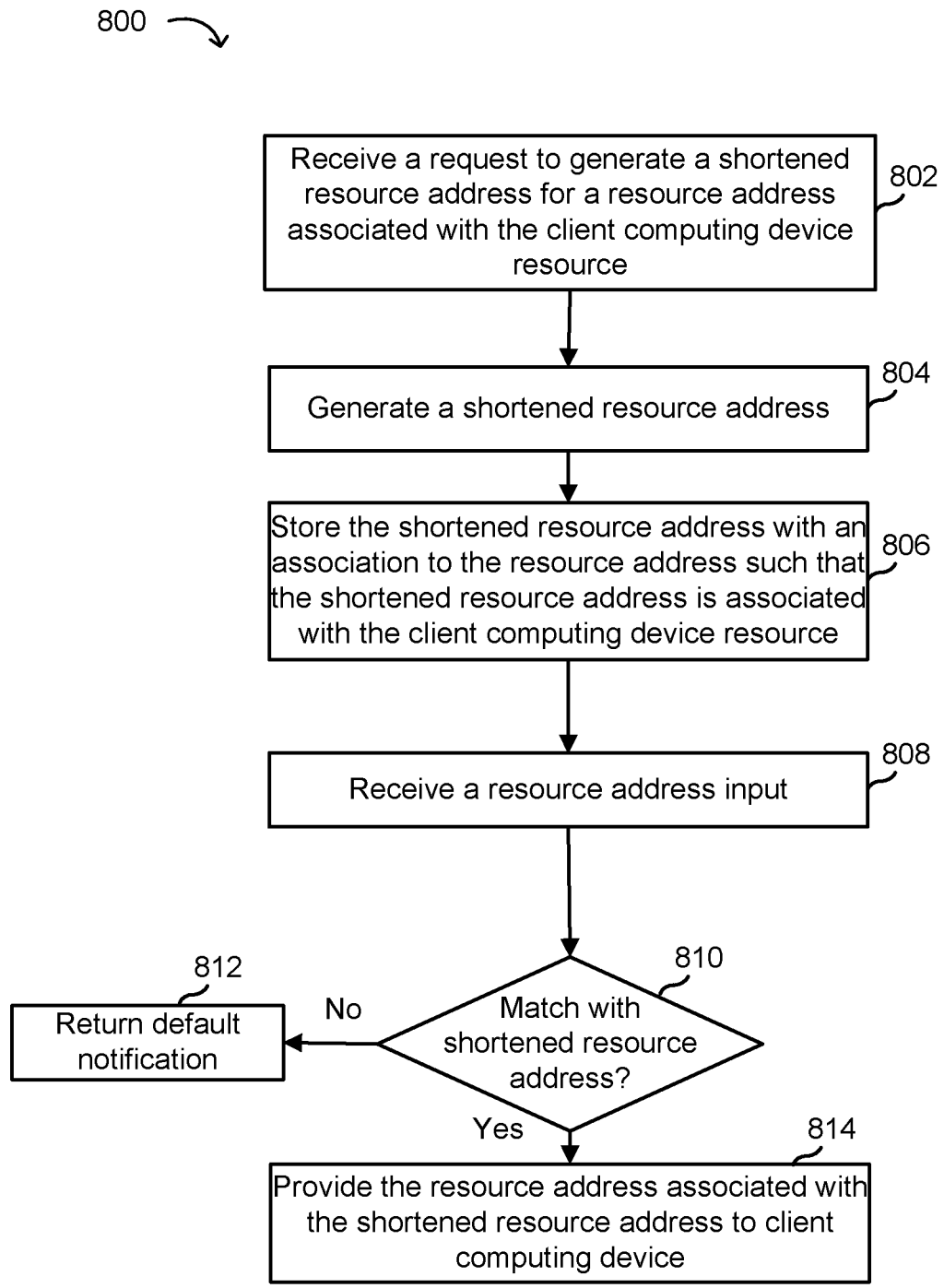
FIG. 8 is a flow chart illustrating an example of a method of resource address shortening for client computing device resources, in accordance with some embodiments of the present disclosure.

FIG. 8 depicts an embodiment of a method 800 of client computing device resource address shortening, which in some embodiments may be implemented with at least some of the components of FIGS. 1 and 2 discussed above. As discussed below, some embodiments make technological improvements to resource address shortening, resource addressing, and resource storage and retrieval. In a variety of examples, the systems and methods of the present disclosure assist in the creation of shortened resource addresses for client computing device resources. The shortened resource addresses are associated with an address of the resource on the client computing device. A user looking for a particular resource may open a resource address shortcut application and enter the shortened resource address, which causes communication with the resource address shortening service that returns the address of the resource on the client computing device. The resource address shortcut application then causes the resource to be opened with any parameters that were stored with the shortened resource addresses at the resource address shortening service.

The method 800 is described as being performed by the resource address shortening service 205 included on the resource computing device 104/200. Furthermore, it is contemplated that the client computing device 102/700 may include some or all the functionality of the client computing device resource 704, the resource address shortening service 205, or the resource address shortcut application 705. As such, some or all of the steps of the method 800 may be performed by the client computing device 102/700 and still fall under the scope of the present disclosure. As mentioned above, the resource computing device 104/200 may include one or more processors or one or more servers, and thus the method 800 may be distributed across the those one or more processors or the one or more servers.

The method 800 may begin at block 802 where a request to generate a shortened resource address for a resource address of a client computing device resource provided on a client computing device is received. In an embodiment, at block 802, the resource address shortening service 205 may receive a request to generate a shortened resource address for a resource address of a client computing device resource 704 provided on a client computing device 102/700. The request may include the resource address having a character string and any parameters associated with the client computing device resource 704 or the client computing device 102/700. For example, the parameters may include any personalized settings associated with the user making the request, the specific client computing device resource, the client computing device 102/700 or any other settings or information that may be used access and provide the client computing device resource that would be apparent to one of skill in the art in possession of the present disclosure.

For example, a user of the client computing device 102/700 may access the resource address shortening service 205 via a web browser or via the resource address shortcut application 705 provided on the client computing device 102/700. The resource address shortening service 205 may provide a user interface for the user to select the resource (e.g., an application), parameters associated with the resource (e.g., a resource address (e.g., a file path), a file associated with an application, settings associated with the resource, or other parameters). If a resource is not available for selection, a button or other user input may be presented for the user to notify a development team of the resource address shortening service 205 that a particular client computing device resource is not supported by the resource address shortening service 205. In some embodiments, a client computing device resource may not be supported by the resource address shortening service 205 for various reasons. For example, the client computing device resource may have the same install path on any client computing device 102/700 associated with the enterprise. This way, the user can launch their shortened resource address, on any company desktop machine without the worry of the client computing device resource not launching properly. Another reason a client computing device resource may not be supported is that the client computing device resource should support parameters when launched. If the client computing device resource does not support parameters when launched, then the users are not permitted to set parameters during onboarding.

The method 800 may proceed to block 804 where a shortened resource address is generated for the resource address associated with a client computing device resource. In an embodiment, at block 804, the resource address shortening service 205 may generate a shortened resource address for the resource address of the client computing device resource. The shortened resource address may include a second character string that may include a keyword or keywords portion and a command portion, and the second character string may be different from the first character string included in the resource address associated with the client computing device resource. The keyword may be provided in the request received at block 802 of method 800. In other embodiments, the keyword may be generated based on the parameters received in the request, user information, the resource address, the client computing device resource name or description, or other client computing device information provided in the request that would be apparent to one of skill in the art in possession of the present disclosure.

In an embodiment, the resource address shortening service 205 may provide the client computing device resource information to the resource address shortening algorithm 205a. In various embodiments, the resource address shortening algorithm 205a may include a large language model (LLM) or other artificial intelligence or machine learning model that would be apparent to one of skill in the art in possession of the present disclosure. The client computing device resource information may be provided as inputs to the model. The resource address shortening algorithm 205a may return the keyword or keywords to the resource address shortening service 205 or the entire shortened resource address. In some embodiments, a portion of the shortened resource address may identify the resource address shortening service 205 such that the resource address shortening service 205 is activated when the shortened resource address is inputted into the resource address shortcut application 705 used to access the client computing device resource 704.

For example, at blocks 802 and 804, a user may create a shortcut for the user's "to_do.txt" file that runs on the "Notepad.exe" application. When accessing the user interface of the resource address shortening service 205, the user may select the "Notepad.exe" application, and in a parameter input, the user may enter "to_do.txt" and any other resource information that may be used when opening the client computing device resource. The user may enter a keyword or a shortcut phrase such as "to_do", which the resource address shortening service 205 associates with the application, the client computing device resource, or the client computing device resource address. The resource address shortening service 205 may then use the keyword to generate the shortened resource address of "go to_do" In the shortened resource address/shortcut of "go to_do", "go" may identify the resource address shortening service 205 such that the resource address shortening service 205 is called and performs a matching determination using "to_do" when the shortened resource address is inputted as discussed below. In various embodiments, the parameter input should include a full path or address of that parameter object (e.g., the full path or address of "to_do.txt." When launching the shortcut, as discussed below, the resource address shortening service 205 will first check if the parameter exists or not (e.g., the file path exists or not). If not, then the resource address shortening service 205 will display a message to the user to update the parameter address or location, together with a link to the resource address shortening service 205 of where the update can be made.

The method 800 may proceed to block 806 where the shortened resource address is stored with an association to the resource address of the client computing device resource such that the shortened resource address is associated with the client computing device resource. In an embodiment, at block 808, the resource address shortening service 205 may map the shortened resource address to the resource address that is associated with the client computing device resource. In various embodiments, the resource address shortening service 205 may store a mapping of the shortened resource address to the resource address in the shortened resource address mappings 212 such that the shortened resource address is associated with the client computing device resource 704 for which the shortened resource address was generated. In addition, the shortened resource address may be shared with users of client computing device(s) 102. The shortened resource address may be sent to the users via email, a web posting, or other form of information dissemination that would be apparent to one of skill in the art in possession of the present disclosure.

The method 800 may proceed to block 808 where a resource address input is received. In an embodiment, at block 808, the resource address shortening service 205 may receive a resource address input. For example, the user of client computing device 102 may enter a resource address in a browser or in the resource address shortcut application 705, which may be received by the resource address shortening service 205. As discussed above, the resource address may include an identifier (e.g., "go" in the example above) of the resource address shortening service 205 such that the resource address shortening service 205 is accessed and receives the resource address input.

The method 800 may proceed to decision block 810 where it is determined whether the resource address received matches a shortened resource address that is associated with a client computing device resource. In an embodiment, at decision block 810, the resource address shortening service 205 may determine whether the received resource address is a shortened resource address by matching the received resource address to the stored shortened resource addresses in the shortened resource address mappings 212. In various embodiments, matching the resource address received with the shortened resource address includes matching a client computing device identifier or a user identifier such that the resource address shortening service 205 only searches for shortened resource addresses that are associated with the client computing device 102 or the user accessing the resource address shortening service 205.

If, at decision block 810, the resource address shortcut does not match any of the shortened resource addresses in the shortened resource address mappings 212, then the method 800 may proceed to block 812 where a default notification is returned. In an embodiment, at block 812, the resource address shortening service 205 may provide a default notification if there is no matching shortened resource address in the shortened resource address mappings 212. Continuing with the example above for the shortened resource address "go to_do", the resource address provided by the user may be "go too doo". As a result, the resource address shortening service 205 may determine that there is no match for "go too doo" and return a default notification to the user that there is no matching stored shortened resource address.

If, at decision block 810, the resource address shortcut matches any of the shortened resource addresses in the shortened resource address mappings 212, then the method 800 may proceed to block 814 where the client computing device resource address is provided to the client computing device and causes the client computing device to provide the client computing device resource. In an embodiment, at block 814, the resource address shortening service 205 may send the client computing device resource address of the client computing device resource 704 to the client computing device 102. The resource address shortcut application 705 may execute the client computing device resource address such as, for example, executing the client computing device resource 704 with the predefined parameters that are associated with the shortened resource address. Based on the resource address shortcut, the client computing device resource and parameters may be fetched from the database 210. A client computing device shell process may programmatically be opened by the resource address shortening service 205, passing the client computing device resource and parameter information, causing the desired client computing device resource to be launched.

In various embodiments of method 800, the resource address shortening algorithm 205*a* may obtain training inputs from the resource address shortening system 100 as it is being operated. For example, the resource address shortening algorithm 205*a* may obtain feedback from users when the shortened resource address is created and provided to users as described in block 806. For example, a user may manually change the shortened resource address or send a request that a different shortened resource address be generated. In other examples, the user may do nothing and begin using the shortened resource address. This feedback or lack of feedback may be used to train the resource address shortening algorithm 205*a*. Other training inputs may include user inputs of shortened resource addresses that are received by the resource address shortening service 205. For example, other training inputs may include the number of received shortened resource addresses that match the stored shortened resource addresses, a number of non-matching shortened resource addresses received, the lack of use of a shortened resource address, or other training inputs that may adjust or train the resource address shortening algorithm 205*a* according to the user of the client computing device 102/700. As such, the resource address shortening algorithm 205*a* may learn what are user-friendly human-readable shortened resource addresses based on user feedback and training of the resource address shortening algorithm 205*a*.

In other embodiments, the method 800 may be repeated for multiple client computing device resources 704. In yet other various embodiments, each client computing device resource address may be associated with more than one shortened resource address. Furthermore, the resource address shortening service 205 may prevent duplicate shortened resource addresses from being generated for different resources. In various embodiments, if a client computing device resource address is changed, the resource address shortening service 205 may receive an indication of the change from the resource address shortcut application 705 and update the mappings in the shortened resource address mappings 212.

Figure 9:
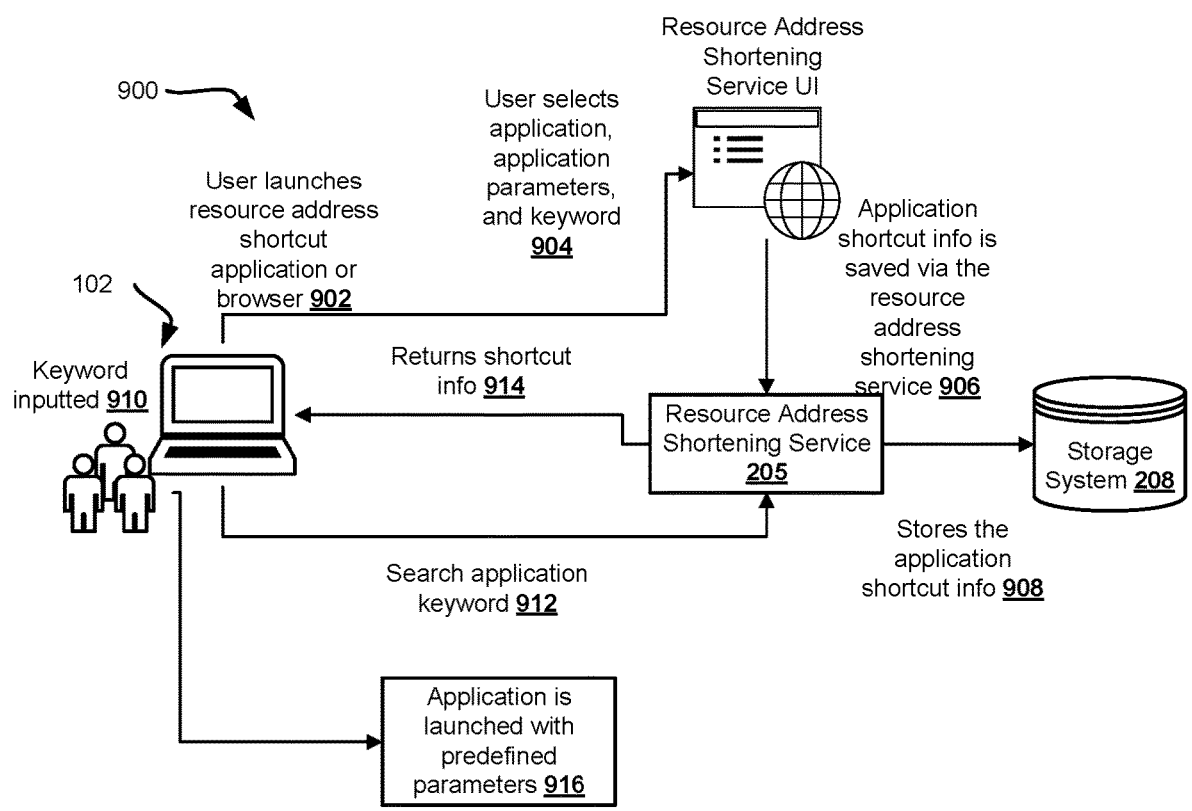
FIG. 9 illustrates a block diagram of an example of resource address shortening during the method of FIG. 8 for a file path of a client computing device stored application, in accordance with some embodiments of the present disclosure.

FIG. 9 illustrates an example of workflow 900 of the method 800. At step 902, a user, via the client computing device 102, may launch the resource address shortcut application 705 and access a user interface (UI) of the resource address shortening service 205. At step 904, the user may input application shortcut info which may include selecting the application, entering application parameters, and generating a keyword into the user interface of the resource address shortening service 205. At step 906, the application shortcut info may be saved via the resource address shortening service 205 and stored, at step 908, in the storage system 208. Subsequently, at step 910, a user may enter the keyword into the resource address shortcut application 705 and the resource address shortcut application 705 sends a request to the resource address shortening service 205 at step 912. The resource address shortening service 205 may then search the storage system 208 for the keyword, retrieve the shortcut information, which may include application parameters (e.g., client computing device resource address), and return the shortcut information to the client computing device 102, at step 914. At step 916, the resource address shortcut application 705 may use the shortcut information to launch the application (e.g., the client computing device resource 704) with the predefined parameters.

Thus, the systems and methods of the present disclosure provide client computing device resource address shortening for client computing device resources. A resource address shortening service may receive a user request to shorten a client computing device resource address. The resource address shortening service may associate a shortened resource address with the resource address and notify users of shortened resource address so that users may use the shortened resource address when attempting to access its associated resource on the client computing device. As such, improvements to the resource address shortening technology is realized that provides more effective resource addresses and thus reduces network traffic, resource access time, computer resource access, and other technological benefits that would be appreciated by one skill in the art in possession of the present disclosure.

Figure 10:
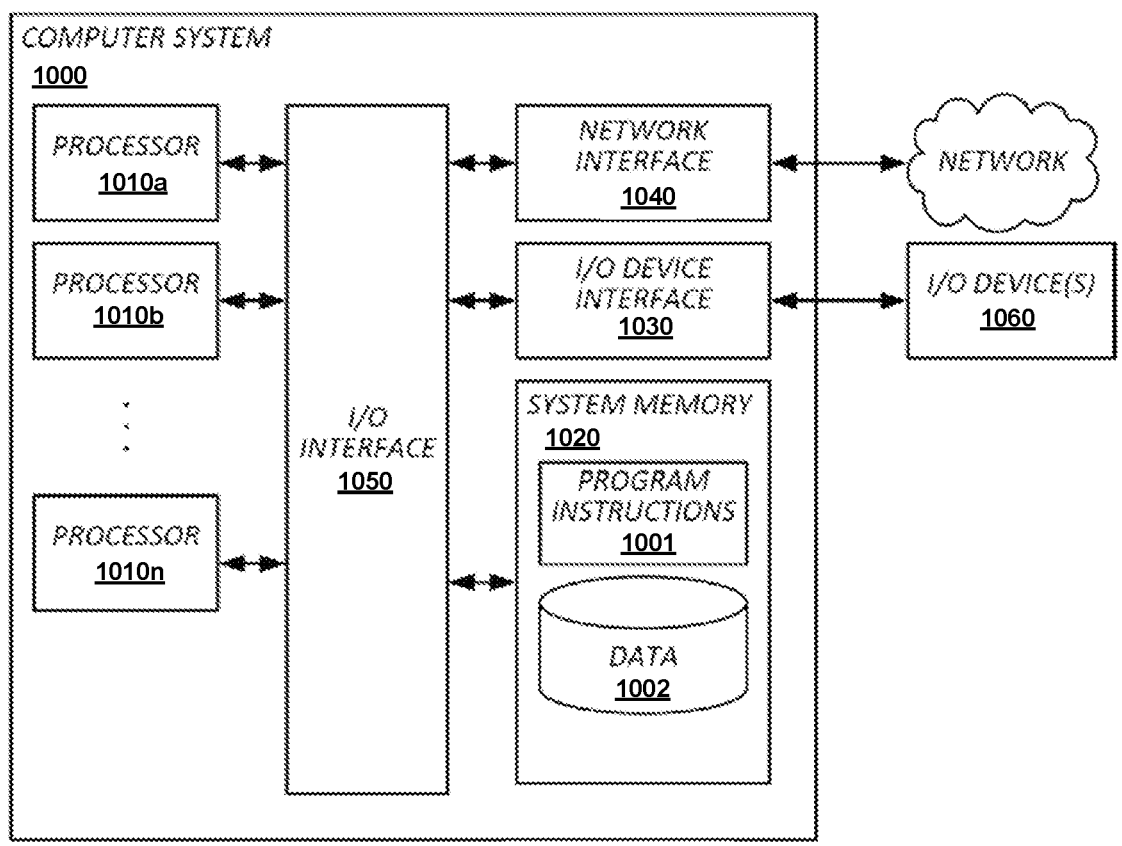
FIG. 10 illustrates an example computing device by which the present techniques may be implemented, in accordance with some embodiments of the present disclosure.

FIG. 10 is a diagram that illustrates an exemplary computing system 1000 in accordance with embodiments of the present technique. The client computing device 102 and 700 and the resource computing devices 104 and 200, discussed above, may be provided by the computing system 1000. Various portions of systems and methods described herein, may include or be executed on one or more computing systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array), an artificial intelligence accelerator, or an ASIC (application specific integrated circuit). As such, the processors or computing systems described herein may include any of the special purpose logic circuitry Computing system 1000 may include a plurality of computing devices (e.g., distributed computing systems) to implement various processing functions.

I/O device interface 1030 may provide an interface for connection of one or more I/O devices 1060 to computing system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing system 1000 through a wired or wireless connection. I/O devices 1060 may be connected to computing system 1000 from a remote location. I/O devices 1060 located on remote computing system, for example, may be connected to computing system 1000 via a network and network interface 1040.

Network interface 1040 may include a network adapter that provides for connection of computing system 1000 to a network. Network interface 1040 may facilitate data exchange between computing system 1000 and other devices connected to the network (e.g., the network 108). Network interface 1040 may support wired or wireless communication. The network may include an electronic communication network, such as the Internet, a local area network (LAN), a wide area network (WAN), a cellular communications network, or the like.

System memory 1020 may be configured to store program instructions 1001 or data 1002. Program instructions 1001 may be executable by a processor (e.g., one or more of processors 1010a-1010n) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A system, comprising: one or more processors; and memory storing instructions that when executed by the one or more processors cause the one or more processors to effectuate operations comprising: receiving a request to generate a shortened resource address for a resource address associated with a client computing device resource stored on a client computing device, wherein the resource address is defined by a first character string, and wherein the request includes parameters associated with the client computing device resource; generating, based on at least a portion of the parameters and for the client computing device resource, a shortened resource address including a second character string that has different characters than the first character string; and storing the second character string and the parameters with an association to the first character string in a client computing device resource database such that the second character string is associated with the client computing device resource.

2. The system of embodiment 1, wherein the operations further comprise: receiving, from the client computing device, a resource address input that includes a shortcut from the client computing device; determining that a character string included in the resource address input matches the second character string stored in the client computing device resource database; and providing, in response to the character string included in the resource address input matching the second character string, the parameters that include the first character string to the client computing device to cause the client computing device to execute, with the parameters, the client computing device resource that is associated with the first character string.

3. The system of embodiment 2, wherein the matching of the character string included in the resource address input to the second character string stored in the client computing device resource database includes determine whether a hash collision occurs between a hash of the character string included in the resource address input to a hash of the second character string.

4. The system of embodiment 2, wherein the resource address input includes a first portion that identifies a resource address shortening service that performs the matching and a second portion that includes the second character string.

5. The system of any one of embodiments 1-4, wherein the generating the second character string comprises: providing at least one of a name of the client computing device resource or the parameters as input to a large language model; and prompting the large language model to generate the second character string based on at least one of the name of the client computing device resource or the parameters.

6. The system of embodiment 5, wherein the second character string comprises user-friendly, human-readable text, wherein the large language model determines a user-friendliness score of the second character string based on a feedback mechanism.

7. The system of any one of embodiments 1-6, wherein the operations further comprise: receiving a notification that the resource address for the client computing device resource has changed to a subsequent resource address; and updating the resource address to the subsequent resource address for the client computing device resource in the client computing device resource database such that the shortened resource address is associated with the subsequent resource address.

8. A method, comprising: receiving, by a computer system, a request to generate a shortened resource address for a resource address associated with a client computing device resource stored on a client computing device, wherein the resource address is defined by a first character string, and wherein the request includes parameters associated with the client computing device resource; generating, by the computer system, based on at least a portion of the parameters, and for the client computing device resource, a shortened resource address including a second character string that has different characters than the first character string; and storing, by the computer system, the second character string and the parameters with an association to the first character string in a client computing device resource database such that the second character string is associated with the client computing device resource.

9. The method of embodiment 8, further comprising: receiving, from the client computing device, a resource address input that includes a shortcut from the client computing device; determining that a character string included in the resource address input matches the second character string stored in the client computing device resource database; and providing, in response to the character string included in the resource address input matching the second character string, the parameters that include the first character string to the client computing device to cause the client computing device to execute, with the parameters, the client computing device resource that is associated with the first character string.

10. The method of embodiment 9, wherein the matching of the character string included in the resource address input to the second character string stored in the client computing device resource database includes determine whether a hash collision occurs between a hash of the character string included in the resource address input to a hash of the second character string.

11. The method of embodiment 9, wherein the resource address input includes a first portion that identifies a resource address shortening service that performs the matching and a second portion that includes the second character string.

12. The method of any one of embodiments 8-11, wherein the generating the second character string comprises: providing at least one of a name of the client computing device resource or the parameters as input to a large language model; and prompting the large language model to generate the second character string based on at least one of the name of the client computing device resource or the parameters.

13. The method of embodiment 12, wherein the second character string comprises user-friendly, human-readable text, wherein the large language model determines a user-friendliness score of the second character string based on a feedback mechanism.

14. The method of any one of embodiments 8-13, further comprising: receiving a notification that the resource address for the client computing device resource has changed to a subsequent resource address; and updating the resource address to the subsequent resource address for the client computing device resource in the client computing device resource database such that the shortened resource address is associated with the subsequent resource address.

15. A non-transitory, computer-readable medium storing instructions that, when executed by one or more processors, effectuate operations comprising: receiving, by a computer system, a request to generate a shortened resource address for a resource address associated with a client computing device resource stored on a client computing device, wherein the resource address is defined by a first character string, and wherein the request includes parameters associated with the client computing device resource; generating, by the computer system, based on at least a portion of the parameters, and for the client computing device resource, a shortened resource address including a second character string that has different characters than the first character string; and storing, by the computer system, the second character string and the parameters with an association to the first character string in a client computing device resource database such that the second character string is associated with the client computing device resource.

16. The medium of embodiment 15, wherein the operations further comprise: receiving, from the client computing device, a resource address input that includes a shortcut from the client computing device; determining that a character string included in the resource address input matches the second character string stored in the client computing device resource database; and providing, in response to the character string included in the resource address input matching the second character string, the parameters that include the first character string to the client computing device to cause the client computing device to execute, with the parameters, the client computing device resource that is associated with the first character string.

17. The medium of embodiment 16, wherein the matching of the character string included in the resource address input to the second character string stored in the client computing device resource database includes determine whether a hash collision occurs between a hash of the character string included in the resource address input to a hash of the second character string.

18. The medium of embodiment 16, wherein the resource address input includes a first portion that identifies a resource address shortening service that performs the matching and a second portion that includes the second character string.

19. The medium of any one of embodiments 15-18, wherein the generating the second character string comprises: providing at least one of a name of the client computing device resource or the parameters as input to a large language model; and prompting the large language model to generate the second character string based on at least one of the name of the client computing device resource or the parameters.

20. The medium of embodiment 19, wherein the second character string comprises user-friendly, human-readable text, wherein the large language model determines a user-friendliness score of the second character string based on a feedback mechanism.

What is claimed is:

1. A system, comprising:
one or more processors; and
memory storing instructions that when executed by the one or more processors cause the one or more processors to effectuate operations comprising:
receiving a request to generate a shortened resource address for a resource address associated with a client computing device resource stored on a client computing device, wherein the resource address is defined by a first character string, and wherein the request includes parameters associated with the client computing device resource;
generating, based on at least a portion of the parameters and for the client computing device resource, a shortened resource address including a second character string that has different characters than the first character string, wherein the second character string comprises user-friendly, human-readable text, wherein a large language model determines at least a portion of the second character string based on a feedback mechanism; and
storing the second character string and the parameters with an association to the first character string in a client computing device resource database such that the second character string is associated with the client computing device resource.

2. The system of claim 1, wherein the operations further comprise:
receiving, from the client computing device, a resource address input that includes a shortcut from the client computing device;
determining that a character string included in the resource address input matches the second character string stored in the client computing device resource database; and
providing, in response to the character string included in the resource address input matching the second character string, the parameters that include the first character string to the client computing device to cause the client computing device to execute, with the parameters, the client computing device resource that is associated with the first character string.

3. The system of claim 2, wherein the matching of the character string included in the resource address input to the second character string stored in the client computing device resource database includes determining whether a hash collision occurs between a hash of the character string included in the resource address input to a hash of the second character string.

4. The system of claim 2, wherein the resource address input includes a first portion that identifies a resource address shortening service that performs the matching and a second portion that includes the second character string.

5. The system of claim 1, wherein the generating the second character string comprises:
providing at least one of a name of the client computing device resource or the parameters as input to the large language model; and
prompting the large language model to generate the second character string based on at least one of the name of the client computing device resource or the parameters.

6. The system of claim 1, wherein the operations further comprise:
receiving a notification that the resource address for the client computing device resource has changed to a subsequent resource address; and
updating the resource address to the subsequent resource address for the client computing device resource in the client computing device resource database such that the shortened resource address is associated with the subsequent resource address.

7. The system of claim 1, wherein the user-friendly, human-readable text of the second character string changes over time based on the feedback mechanism.

8. A method, comprising:
receiving, by a computer system, a request to generate a shortened resource address for a resource address associated with a client computing device resource stored on a client computing device, wherein the resource address is defined by a first character string, and wherein the request includes parameters associated with the client computing device resource;
generating, by the computer system, based on at least a portion of the parameters, and for the client computing device resource, a shortened resource address including a second character string that has different characters than the first character string, wherein the second character string comprises user-friendly, human-readable text, wherein a large language model determines at least a portion of the second character string based on a feedback mechanism; and
storing, by the computer system, the second character string and the parameters with an association to the first character string in a client computing device resource database such that the second character string is associated with the client computing device resource.

9. The method of claim 8, further comprising:
- receiving, from the client computing device, a resource address input that includes a shortcut from the client computing device;
- determining that a character string included in the resource address input matches the second character string stored in the client computing device resource database; and
- providing, in response to the character string included in the resource address input matching the second character string, the parameters that include the first character string to the client computing device to cause the client computing device to execute, with the parameters, the client computing device resource that is associated with the first character string.

10. The method of claim 9, wherein the matching of the character string included in the resource address input to the second character string stored in the client computing device resource database includes determining whether a hash collision occurs between a hash of the character string included in the resource address input to a hash of the second character string.

11. The method of claim 9, wherein the resource address input includes a first portion that identifies a resource address shortening service that performs the matching and a second portion that includes the second character string.

12. The method of claim 8, wherein the generating the second character string comprises:
- providing at least one of a name of the client computing device resource or the parameters as input to the large language model; and
- prompting the large language model to generate the second character string based on at least one of the name of the client computing device resource or the parameters.

13. The method of claim 8, further comprising:
- receiving a notification that the resource address for the client computing device resource has changed to a subsequent resource address; and
- updating the resource address to the subsequent resource address for the client computing device resource in the client computing device resource database such that the shortened resource address is associated with the subsequent resource address.

14. The method of claim 8, wherein the user-friendly, human-readable text of the second character string changes over time based on the feedback mechanism.

15. A non-transitory, computer-readable medium storing instructions that, when executed by one or more processors, effectuate operations comprising:
- receiving, by a computer system, a request to generate a shortened resource address for a resource address associated with a client computing device resource stored on a client computing device, wherein the resource address is defined by a first character string, and wherein the request includes parameters associated with the client computing device resource;
- generating, by the computer system, based on at least a portion of the parameters, and for the client computing device resource, a shortened resource address including a second character string that has different characters than the first character string, wherein the second character string comprises user-friendly, human-readable text, wherein a large language model determines at least a portion of the second character string based on a feedback mechanism; and
- storing, by the computer system, the second character string and the parameters with an association to the first character string in a client computing device resource database such that the second character string is associated with the client computing device resource.

16. The medium of claim 15, wherein the operations further comprise:
- receiving, from the client computing device, a resource address input that includes a shortcut from the client computing device;
- determining that a character string included in the resource address input matches the second character string stored in the client computing device resource database; and
- providing, in response to the character string included in the resource address input matching the second character string, the parameters that include the first character string to the client computing device to cause the client computing device to execute, with the parameters, the client computing device resource that is associated with the first character string.

17. The medium of claim 16, wherein the matching of the character string included in the resource address input to the second character string stored in the client computing device resource database includes determining whether a hash collision occurs between a hash of the character string included in the resource address input to a hash of the second character string.

18. The medium of claim 16, wherein the resource address input includes a first portion that identifies a resource address shortening service that performs the matching and a second portion that includes the second character string.

19. The medium of claim 15, wherein the generating the second character string comprises:
- providing at least one of a name of the client computing device resource or the parameters as input to the large language model; and
- prompting the large language model to generate the second character string based on at least one of the name of the client computing device resource or the parameters.

20. The medium of claim 15, wherein the user-friendly, human-readable text of the second character string changes over time based on the feedback mechanism.

* * * * *